(12) United States Patent
Nelson

(10) Patent No.: US 8,294,712 B2
(45) Date of Patent: Oct. 23, 2012

(54) SCALABLE METHOD FOR RAPIDLY DETECTING POTENTIAL GROUND VEHICLE UNDER COVER USING VISUALIZATION OF TOTAL OCCLUSION FOOTPRINT IN POINT CLOUD POPULATION

(75) Inventor: James M. Nelson, Sumner, WA (US)

(73) Assignee: The Boeing Company, Chicago, IL (US)

( * ) Notice: Subject to any disclaimer, the term of this patent is extended or adjusted under 35 U.S.C. 154(b) by 1286 days.

(21) Appl. No.: 11/775,430

(22) Filed: Jul. 10, 2007

(65) Prior Publication Data
US 2008/0123961 A1   May 29, 2008

Related U.S. Application Data

(63) Continuation-in-part of application No. 10/666,149, filed on Sep. 19, 2003, now abandoned.

(51) Int. Cl.
*G06T 15/40* (2011.01)
*G06T 15/00* (2011.01)

(52) U.S. Cl. ........................ 345/421; 345/419

(58) Field of Classification Search ................ None
See application file for complete search history.

(56) References Cited

U.S. PATENT DOCUMENTS

| | | |
|---|---|---|
| 4,050,067 A | 9/1977 | Elmore, Jr. |
| 4,170,006 A | 10/1979 | Falk |
| 4,660,044 A | 4/1987 | Lavelle |
| 4,963,036 A | 10/1990 | Drisko et al. |
| 5,166,688 A | 11/1992 | Moreira |
| 5,196,854 A | 3/1993 | Mathews |
| 5,337,149 A | 8/1994 | Kozah et al. |
| 5,559,935 A * | 9/1996 | Itoh et al. ................ 345/424 |
| 5,988,862 A | 11/1999 | Kacyra et al. |
| 6,044,336 A | 3/2000 | Marmarelis et al. |
| 6,166,744 A | 12/2000 | Jaszlics et al. |
| 6,232,913 B1 | 5/2001 | Lehtinen |
| 6,240,367 B1 | 5/2001 | Lin |
| 6,246,468 B1 | 6/2001 | Dimsdale |
| 6,249,600 B1 | 6/2001 | Reed et al. |
| 6,292,215 B1 | 9/2001 | Vincent |

(Continued)

FOREIGN PATENT DOCUMENTS
WO    WO9411750    5/1994

OTHER PUBLICATIONS

Foley et al., "Computer Graphics", 1990, Addison-Wesely Publishing Company, Inc., Second Edition, pp. 1034-1036 and pp. 1047-1048.

(Continued)

*Primary Examiner* — Daniel Hajnik
(74) *Attorney, Agent, or Firm* — Caven & Aghevli LLC

(57) ABSTRACT

Techniques for facilitating detection of an object in a point cloud of three-dimensional imaging data representing an area of study where the object potentially is obscured by intervening obstacles are provided. The imaging data is processed to identify elements in the point cloud having substantially common attributes signifying that the identified elements correspond to a feature in the area of study. An isosurface is generated associating the elements having substantially common attributes. A reversed orientation visualization model for a region of interest is generated. The reversed orientation visual model areas of total occlusion that potentially signify presence of the object.

19 Claims, 7 Drawing Sheets

U.S. PATENT DOCUMENTS

| | | | |
|---|---|---|---|
| 6,307,556 B1 | 10/2001 | Ellenby et al. | |
| 6,330,523 B1 | 12/2001 | Kacyra et al. | |
| 6,420,698 B1 | 7/2002 | Dimsdale | |
| 6,456,226 B1 | 9/2002 | Zheng et al. | |
| 6,473,079 B1 | 10/2002 | Kacyra et al. | |
| 6,476,803 B1 * | 11/2002 | Zhang et al. | 345/419 |
| 6,512,518 B2 | 1/2003 | Dimsdale | |
| 6,512,993 B2 | 1/2003 | Kacyra et al. | |
| 6,526,352 B1 | 2/2003 | Breed et al. | |
| 6,583,751 B1 | 6/2003 | Ferretti et al. | |
| 6,619,406 B1 | 9/2003 | Kacyra et al. | |
| 6,674,436 B1 * | 1/2004 | Dresevic et al. | 345/472 |
| 6,707,415 B1 | 3/2004 | Christianson | |
| 6,759,979 B2 | 7/2004 | Vashisth et al. | |
| 2001/0010546 A1 | 8/2001 | Chen | |
| 2002/0060784 A1 | 5/2002 | Pack et al. | |
| 2003/0073406 A1 | 4/2003 | Benjamin et al. | |
| 2003/0090415 A1 | 5/2003 | Miyasaka et al. | |
| 2005/0243323 A1 * | 11/2005 | Hsu et al. | 356/450 |

OTHER PUBLICATIONS

Lin, C., "TWO0444129B:Full Fusion Positioning Method for Vehicle", found at http://www.delphion.com, pp. 2, Jul. 2001.

Schilling et al., "Multiple-Return Laser Radar for Three-Dimensional Imaging Through Obscurations", May 20, 2002, Optical Society of America, Applied Optics, vol. 41, No. 15, pp. 2791-2799.

Valle et al., Binner, Mar. 29, 2001, International AVS Centre, found at http://www.iavsc.org/repository/express/pages/binner/doc_umac.shtml, p. 1-5.

* cited by examiner

SCALABLE METHOD FOR RAPIDLY DETECTING POTENTIAL GROUND VEHICLE UNDER COVER USING VISUALIZATION OF TOTAL OCCLUSION FOOTPRINT IN POINT CLOUD POPULATION

CROSS REFERENCE TO RELATED APPLICATION

This patent application is a continuation-in-part of copending, commonly-owned U.S. patent application Ser. No. 10/666,149 entitled "Scalable method for rapidly detecting potential ground vehicle under cover using visualization of total occlusion footprint in point cloud population" filed on Sep. 19, 2003, which application is incorporated herein by reference.

GOVERNMENT LICENSE RIGHTS

This disclosure was made with Government support under U.S. Government contract DAAD17-01-C-0074 A 001 awarded by Defense Advanced Research Projects Agency ("DARPA"). The Government has certain rights in this disclosure.

TECHNICAL FIELD

The present disclosure relates generally to a ladar system and, more specifically, to improving detection of partially obstructed targets using line-of-sight imaging technologies.

BACKGROUND

Over the past several decades, radar and similar imaging technologies have greatly improved. For example, the advent of three-dimensional laser detection and ranging (ladar) systems has greatly increased the ability to detect objects of interest by generating imaging data with much greater resolution than was possible with predecessor technologies. A ladar device is capable of digitizing as much as a gigapoint—one billion points—for a single scene. Such high resolution potentially vastly improves the possibility of target detection in the imaged scene.

Two limitations potentially hamper the ability to detect targets using such a ladar system. First, in the case of ladar and other line-of-sight data gathering systems, targets can be concealed by intervening obstructions. For example, if a ground-based target is partially sheltered by foliage or another obstruction between a ladar system and the target, detection of the target becomes more difficult. To take a more specific example, if a vehicle is parked under a tree, data generated by an aerial ladar system may not clearly indicate the presence of the vehicle. Although the tree is at least a partially permeable obstruction, the presence of the tree changes the profile of the data collected and thus obscures the presence of the ground-based target.

Second, the processing capability required to process enormous, gigapoint ladar images is overwhelming. Computer processing hardware performance has vastly improved, but not enough to completely process such a wealth of data. Computing time for processes such as mesh generation or sorting points may scale too slowly to be practical using available computing resources. For a number of raw data points, N, processing times for mesh generation or sorting points become practically unworkable for very large numbers of data points. Conventional methods involve processing times on the order of N log (N). To successfully meet objects of ladar and other sophisticated detection systems, more rapid detection of targets is desired than is possible with such a conventional processing system.

To make processing ladar data practical, a number of steps to scale the vast number of raw data points must be minimized, parallelized, or simply eliminated. One method to reduce the volume of raw data is to sample the available data by selecting a subset of the available data points. Typically, sampling involves selecting a representative point from each of a number of zones from a pre-selected grid. Unfortunately, reducing the number of data points in such a manner reduces available spatial precision in resolving the area being scanned.

One way to try to balance desires for high precision and tractable processing times is to allow a ladar operator to select and re-select alternative regions of interest in an area of study and to adjust spatial sampling resolution for those regions of interest. In this manner, the user can have desired precision and resolution on an as-desired basis, thereby allowing the user the greatest possible precision where the user wants it while not overwhelming the capacity of the ladar processing system.

However, even if a ladar operator chooses to highlight a region of interest including a partially-obscured target, the processed data may not reveal the presence of the target to the operator. Thus, there is an unmet need in the art to improve detection of targets, particularly where the targets may be at least partially obscured from a line-of-sight view by intervening objects.

SUMMARY

The present disclosure techniques for detecting concealed ground-based targets. Using visualization of total occlusion footprints generated from a point cloud population, embodiments of the present disclosure allow for detection of vehicles or other ground-based targets which otherwise might go undetected in a top-down analysis of a point cloud including the ground-based targets.

More particularly, embodiments of the present disclosure provide for facilitating detection of an object in a point cloud of three-dimensional imaging data representing an area of study where the object potentially is obscured by intervening obstacles. The imaging data is processed to identify elements in the point cloud having substantially common attributes signifying that the identified elements correspond to a feature in the area of study. An isosurface is generated associating the elements having substantially common attributes. A reversed orientation visualization model for a region of interest is generated. The reversed orientation visual model exposes areas of total occlusion that potentially signify presence of the object.

In accordance with further aspects of the present disclosure, three-dimensional imaging data of the scene is gathered, such as by using ladar. In accordance with still further aspects of the present disclosure, imaging data is processed using a population function computed on a sampling mesh by a Fast Binning Method (FBM). Also, the isosurface of the population function is computed using a marching cubes method.

In accordance with other aspects of the present disclosure, a method includes viewing a reversed orientation visualization model of an isosurface, selecting a region of interest from the reversed orientation visualization model, viewing the region of interest of the isosurface as a top-down orientation visualization model, selectively varying the point resolution of the region of interest to adjust the isosurface sampling resolution, and identifying an object within the isosurface.

The features, functions, and advantages can be achieved independently in various embodiments of the present disclosure or may be combined in yet other embodiments.

BRIEF DESCRIPTION OF THE DRAWINGS

Embodiments of systems and methods in accordance with the present disclosure are described in detail below with reference to the following drawings.

DETAILED DESCRIPTION

Methods and systems for providing a geolocation of a plurality of transmitters are described herein. Many specific details of certain embodiments of the disclosure are set forth in the following description and in FIGS. 1 through 8 to provide a thorough understanding of such embodiments. One skilled in the art, however, will understand that the present disclosure may have additional embodiments, or that the present disclosure may be practiced without several of the details described in the following description.

By way of overview, embodiments of the present disclosure provide for facilitating detection of an object in a point cloud of three-dimensional imaging data representing an area of study where the object potentially is obscured by intervening obstacles. The imaging data is processed to identify elements in the point cloud having substantially common attributes signifying that the identified elements correspond to features in the area of study. An isosurface is generated associating the elements having substantially common attributes, thus creating a surface generated from a three-dimensional point population from laser detection and ranging (ladar) data. The isosurface may be rotated (or otherwise represented) and viewed from below the generated surface (i.e., up from underground) to create a reversed orientation visualization model, as if the isosurface was turned inside-out to allow a viewer to visualize different aspects of the isosurface. In an illustrative isosurface including a cube situated on a planar surface, a reversed orientation visualization model would depict a cube-shaped cavity on a planar surface. The reversed orientation visual model exposes areas of total occlusion that potentially signify presence of the object.

Figure 1:
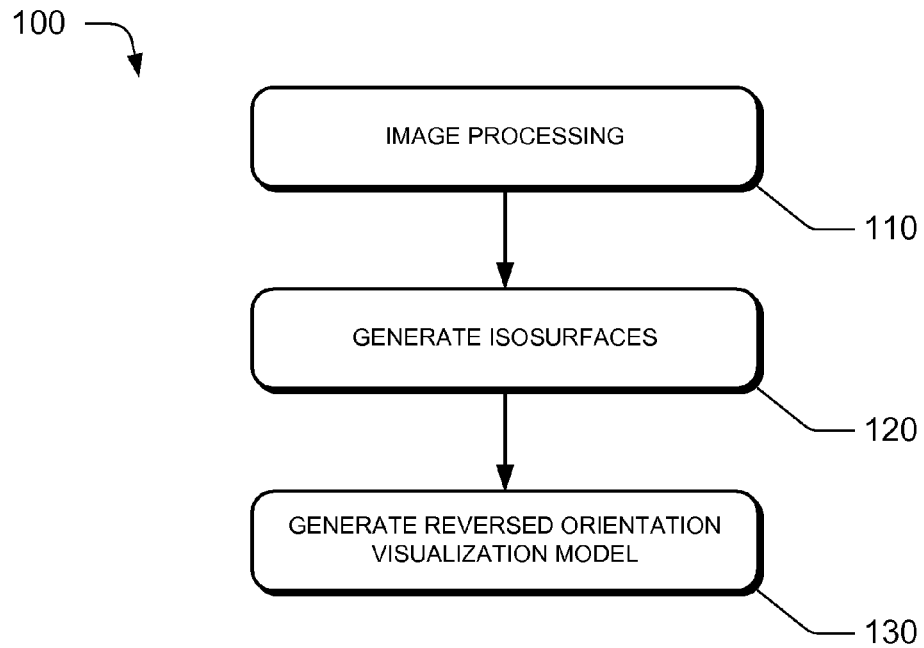
FIG. 1 is a flowchart of a routine for detecting targets according to an embodiment of the disclosure.

Referring now to FIG. 1, a routine 100 according to one presently preferred embodiment of the present disclosure includes three processes facilitating detection of an object in a point cloud of three-dimensional imaging data. The data is collected from an area of study where the object potentially is obscured by intervening obstacles. At a block 110 the imaging data is processed to identify elements in the point cloud having substantially common attributes. The common attributes signify that the identified elements correspond to a feature in the area of study. At a block 120 an isosurface associating the elements having substantially common attributes is generated. The isosurface provides for a visual depiction of the feature or features in the area of study. The visual depiction may not disclose presence of an object because the object may be concealed by intervening objects. For example, where the imaging data is gathered from an aerial location, the object may be a vehicle parked under one or more trees where the object is generally hidden from view. At a block 130, a reversed orientation visualization model for a region of interest is generated. Even though the object may be obscured from view from the aerial location by trees or other permeable or porous obstacles, elements in the three-dimensional data collected may signify presence of solid objects beneath the obstacles. Generating a reversed orientation visualization model, such as an up from underground representation derived from aerially-collected, top-down imaging data, reveals the presence of the objects.

Figure 2:
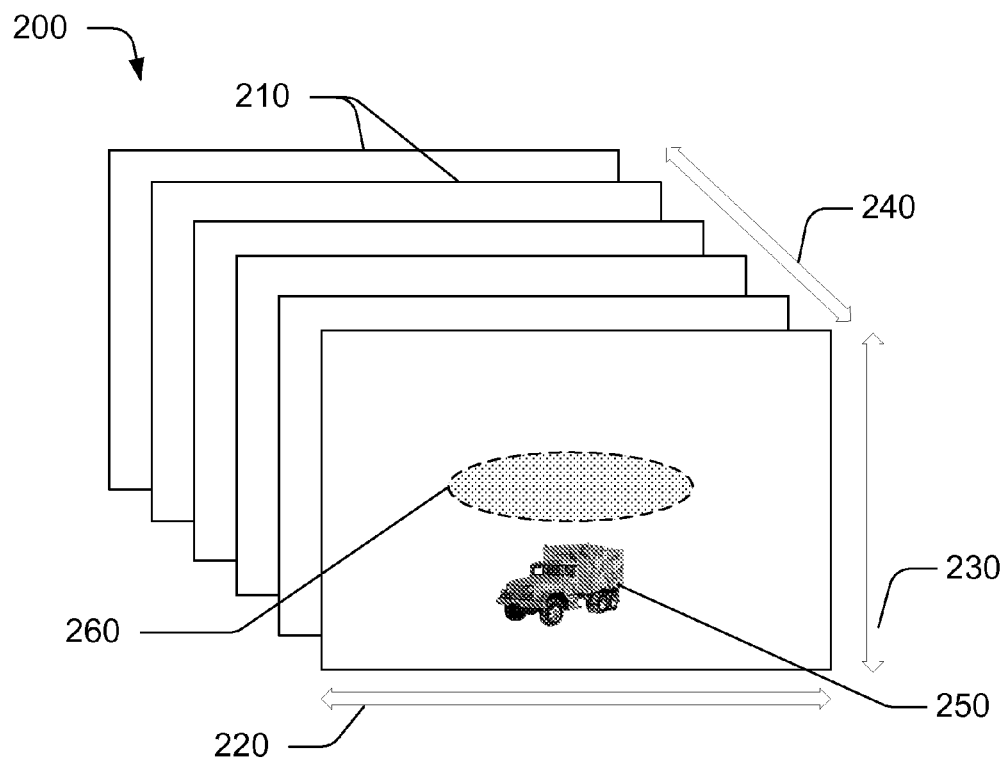
FIG. 2 is a depiction of available three-dimensional data including a target.

FIG. 2 is a depiction of available three-dimensional data 200. The data includes a number of ladar scans 210. Each of the scans 210 plots a number of raw data points at varying azimuth 220 and elevations 230. Each of the scans 210 is part of a series of scans 240, such as may be collected on a sortie or pass over the area under study using an aerial imaging platform such as an aircraft. In the area under study is a target 250 which, in this case, is a vehicle. The target vehicle 250 is obscured from view by an intervening object 260, such as leafy tree limbs. No single scan 210 may reveal the presence of the target 250 because of the intervening object 260 obscuring the view of the target 250 from an observation point (not shown). However, because the intervening object 260 is partially permeable, data collected from the combination of the ladar scans 210 may reveal a number of points signifying presence of a non-permeable, non-porous object beneath the intervening object.

As will be further described below, the implied geometry generated from the scans 210 allows for the collective implied geometries to be resolved revealing a total occlusion zone resolvable into the shape of the target 250. The implied geometry is derived by associating selected data points having equivalent scalar values as calculated from the collected data. Using the implied geometry instead of an explicit geometry presents a number of advantages. One advantage is that the representation of the implied geometry includes an infinite number of explicit geometries, such as isosurfaces of the volume field or a permutation of its spatial derivatives instead of a single, fixed geometry. As a result, ambiguities concerning separation of an adjacent object recede, thereby allowing for reliable analysis even when point cloud data sets have slightly different characteristics. Further advantageously, many local area search and clutter rejection processing steps can be applied to all implied geometries simultaneously. Further, selecting the implicit geometry representation allows level set methods to be developed to replace existing explicit geometry solutions. Use of level set methods allow processing performance to exceed fundamental limits which restrict the maximum processing speed possible based on explicit geometrical representations.

In one presently preferred embodiment, image processing at the block 110 uses a population function computed on a sampling mesh by the Fast Binning Method (FBM). FBM is scalable with the number of data points N, and is fully parallelizable. FBM uses integer truncation of each resolution-scaled coordinate to index a data array element to be incremented. As a result, the values of each sampling point in the computed scalar field numerically correspond to a number of raw data points close to the sampling point. A raw data point may be considered suitably close to the sampling point if, for example, the raw data point is within one-half resolution element of the sampling point. Based on the generated population function, the marching cubes method is used to dynamically compute the isosurface of the population function on the sampling mesh. The marching cubes method scales in proportion to the number of sampling points. For example, where M is the number of sampling points, the marching cubes method scales in proportion with M log(M).

Another advantage of the population function's implied geometrical representation is that it allows geometrical information to be sampled and distributed at different resolutions in parallel thereby allowing for distributed, networked processing and interrogative communication. Support for parallel, distributed processing allows for high processing speeds and redundancy to make loss of one or more single processors endurable. Also, the available parallelism supports dynamic resource allocation.

The data is collected from an area of study where the object potentially is obscured by intervening obstacles. At the block 110 the imaging data is processed to identify elements in the point cloud having substantially common attributes. The common attributes signify that the identified elements correspond to a feature in the area of study. At the block 130, a reversed orientation visualization model for a region of interest is generated. Even though the object may be obscured from view from the aerial location by trees or other permeable or porous obstacles, elements in the three-dimensional data collected may signify presence of solid objects beneath the obstacles. Generating a reversed orientation visualization model, such as an up from underground representation derived from aerially-collected, top-down imaging data, reveals the presence of the objects.

At the block 120 the isosurface associating the elements having substantially common attributes is generated. Isosurfaces present a visual depiction of the implied geometries of the identified features. In one presently preferred embodiment, isosurfaces are depicted as particular shades or colors on an output display. Setting of the isosurface levels suitably is performed automatically as a function of the sampling resolution, adjusting the variation in shade or color per isosurface elevation to reflect the differentiation available from the collected data.

From the processed and isosurface-represented data, a particular region of interest may be identified to reduce processing requirements as compared to conducting further processing on the entire area of study. For the reasons previously described, performing a full analysis of all the collected data may be a computationally-prohibitive process. Accordingly, based on general features of the area under study, a human operator may identify features that may obscure objects of interest.

At the block 130, the implied geometries presented by the population function are used to generate the "up from underground" or reversed orientation visualization model. The description of an "up from underground" visualization model contemplates a system in which data about a region of interest at a low elevation is gathered from a higher elevation observation point with obscuring, intervening objects at an elevation between the region of interest and the observation point.

For example, data suitably is collected from an aerial observation point, such as an aircraft, about the ground below. Other embodiments of the present disclosure are usable to collect data from a low elevation observation point about a higher elevation area of interest. For example, data suitably is collected from a ground level observation point about a high altitude region of interest.

Figure 3:
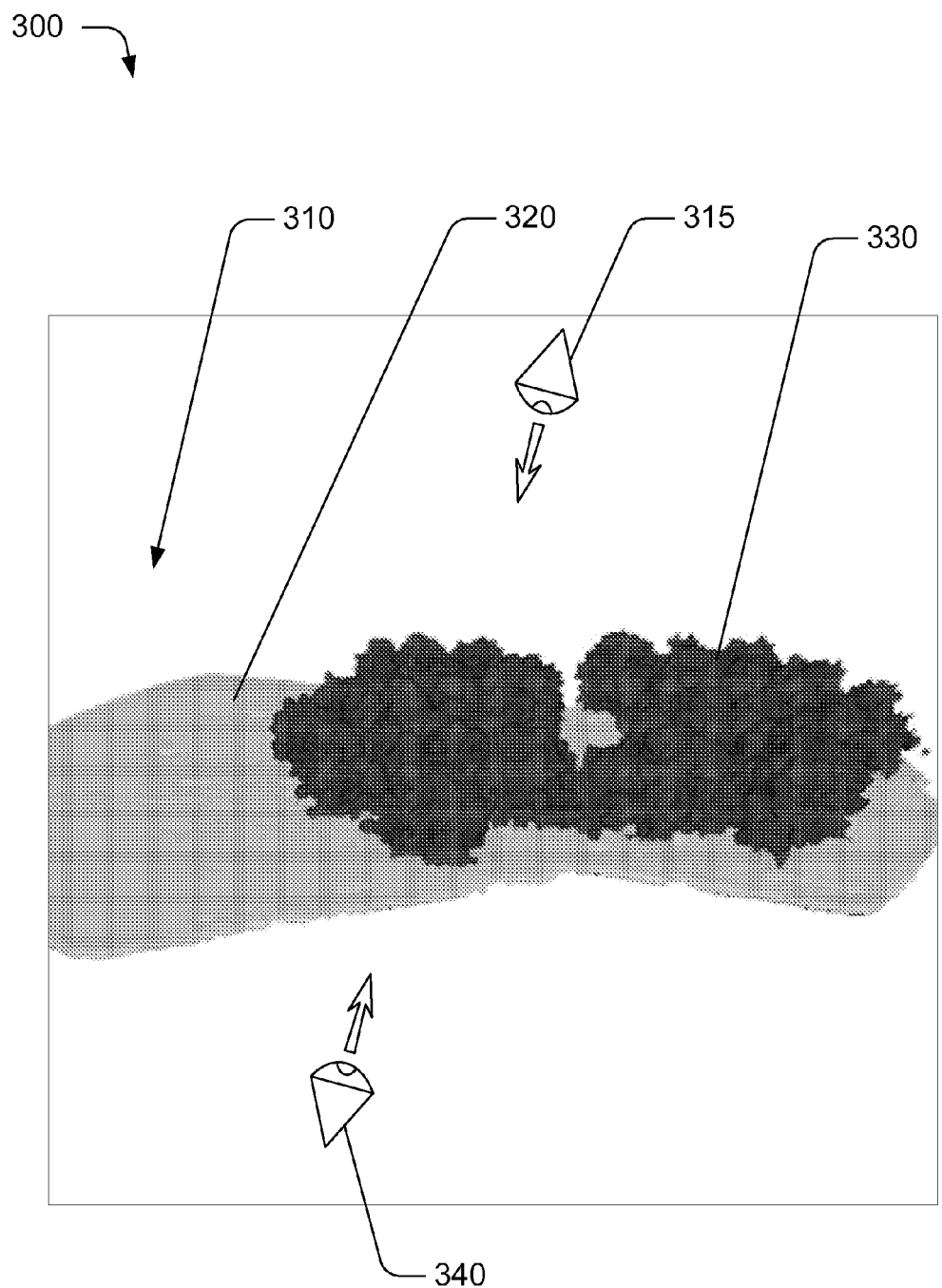
FIG. 3 is a top-down visualization of a region of interest including targets not discernible in this visualization.

As shown by the example in FIG. 3, in the case of a study of a ground-level region of interest a top-down visualization 300 of a region of interest 310 includes isosurfaces of differently-elevated attributes in the field of study. The top-down visualization 300 may be from a first observation point 315, such as the location of an aircraft flying above the region of interest. The region of interest 310 includes a plain 320, such as a field, and an elevated feature such as a stand of trees or a forest 330. The plain 320 is represented by an isosurface with a level associated with a dark shade as shown in FIG. 3. On the other hand, the trees 330 are associated with a plurality of different, lighter shades depending on the generated isosurfaces of the trees 330 or parts thereof. Instead of shades, the different isosurfaces could be represented by different colors, fill patterns, etc. Not discernible in the region of interest 310 includes two parked vehicles. In FIG. 3, the trees 330 obscure the vehicles from view in the visualization shown.

Figure 4:
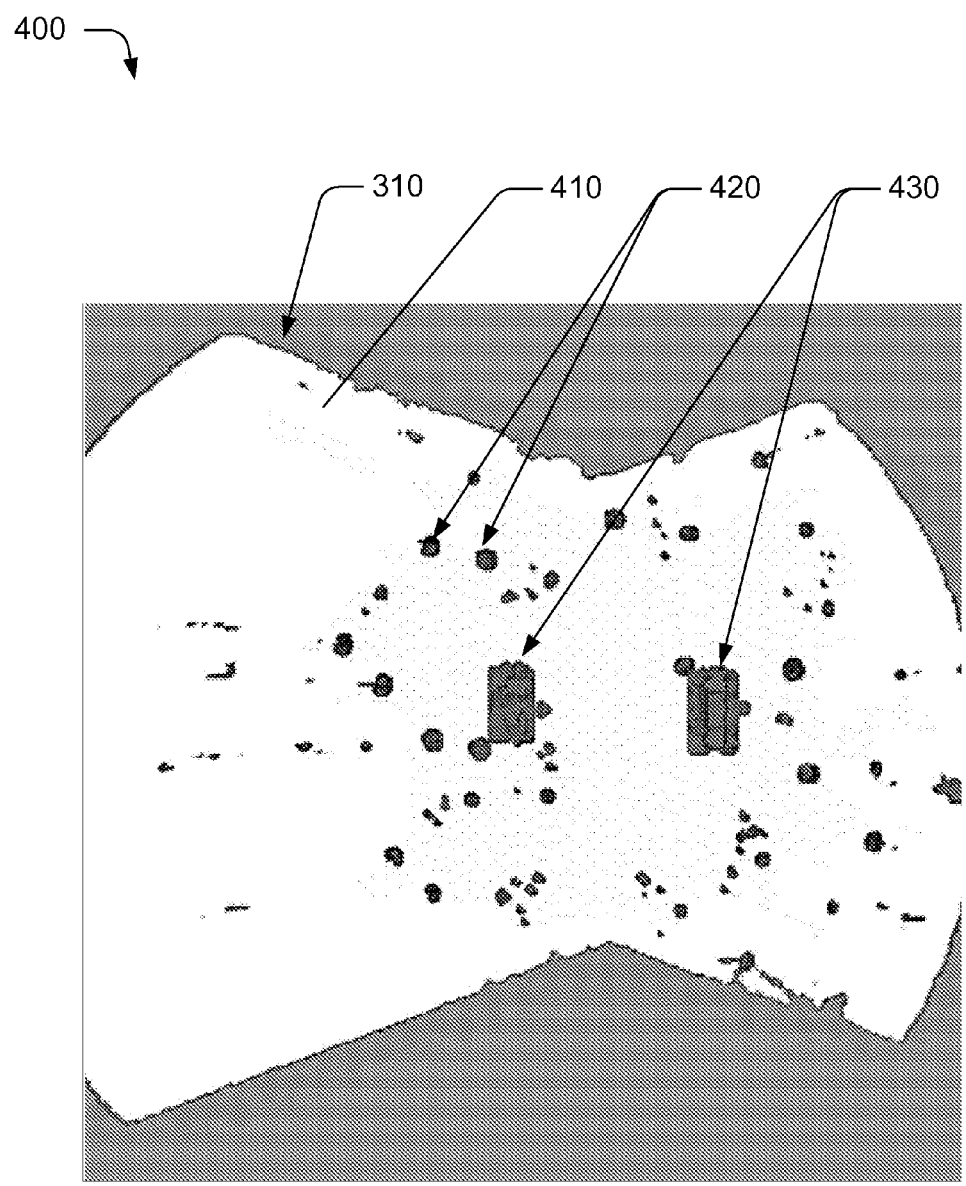
FIG. 4 is an "up from underground" visualization of a region of interest according to an embodiment of the disclosure showing targets partially-obscured in a top-down visualization.

FIG. 4 shows an inverted visualization 400 of the same region of interest 310. Instead of generating the visualization 300 from the perspective of the first observation point 315 as in FIG. 3, the visualization 400 is computed from a second observation point 340, as it would appear from the perspective of the ground looking upward. As shown in FIG. 4, the visualization 400 presents a very different view. The visualization 400 again shows the plain 320 as a darkly-shaded region. However, instead of showing the canopy of the stand of trees 320 (FIG. 3), the visualization 400 shows areas of total occlusion (tree trunks 420 and vehicles 430) representing solid forms at ground level. Trunks of trees are resolved as solid points. Visually differentiable from the tree trunks 420 are the very regular forms of vehicles 430 which were not visible in the top-down visualization 300 (FIG. 3). In other words, by recharacterizing and representing the three-dimensional data collected in the scans 210 (FIG. 2), an "up from underground" visualization 400 allows previously-concealed targets or objects to be discerned.

Figure 5:
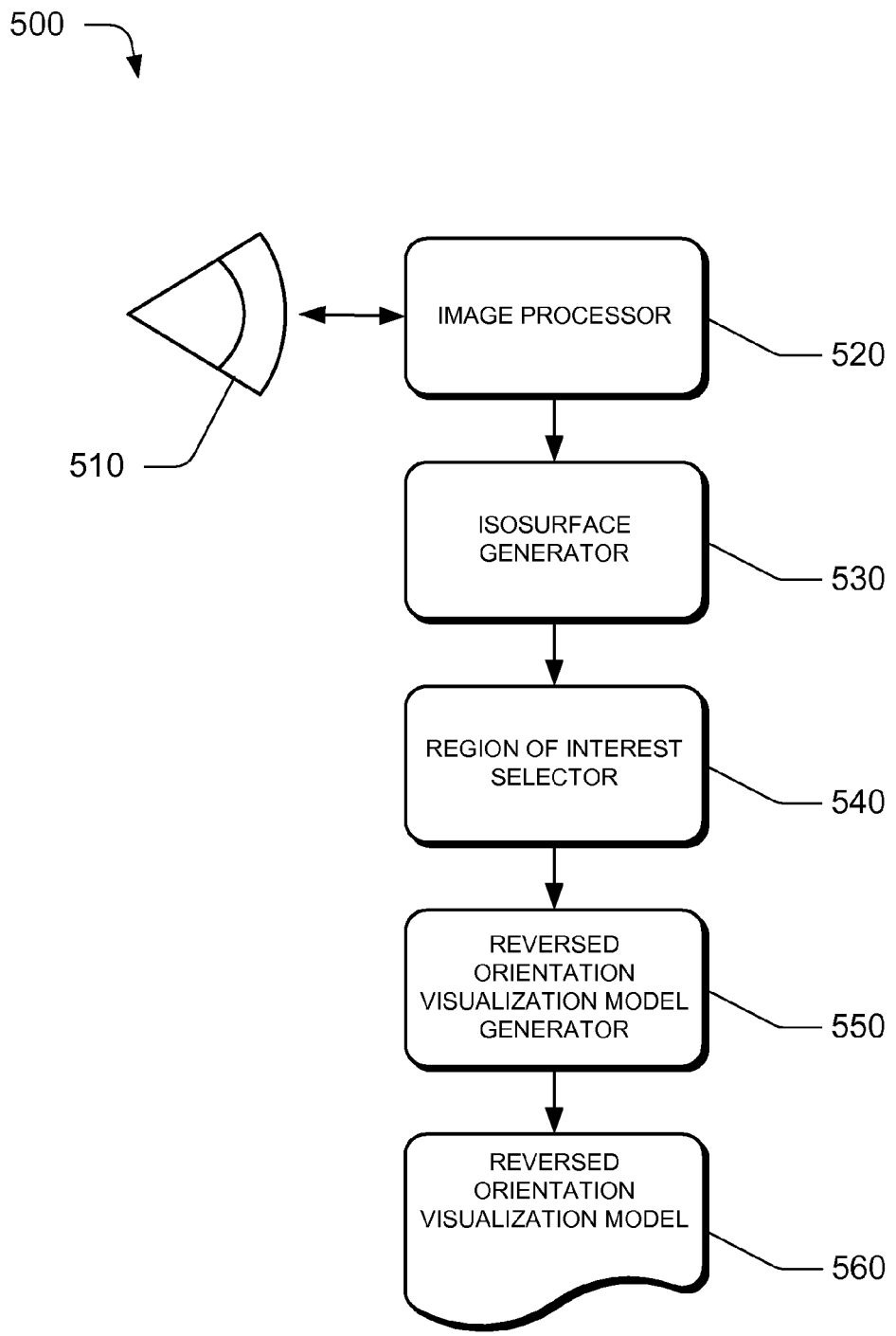
FIG. 5 is a system according to an embodiment of the disclosure.

FIG. 5 shows a system 500 according to an embodiment of the present disclosure. The system 500 includes a data gathering device 510. In one presently preferred embodiment, the data gathering device 510 is a three-dimensional imaging device, such as a ladar system, configured to gather three-dimensional data about an area of study. Receiving the data from the data gathering device 510 is an image processor 520. Using techniques previously described, the image processor 520 uses a population function to derive implied geometries of features imaged by the data gathering device 510. An isosurface generator 530 presents isosurfaces of points for which the population function generator 520 yields equivalent scalar values. A region of interest selector 540 allows an operator to manually identify a particular region of interest from among the isosurface data presented for further study. For the region of interest so identified, a visualization model generator 550 generates an up from underground visualization model of the isosurface data, allowing an operator to perceive areas of shows areas of total occlusion that potentially represent targets or other objects of interest.

Figure 6:
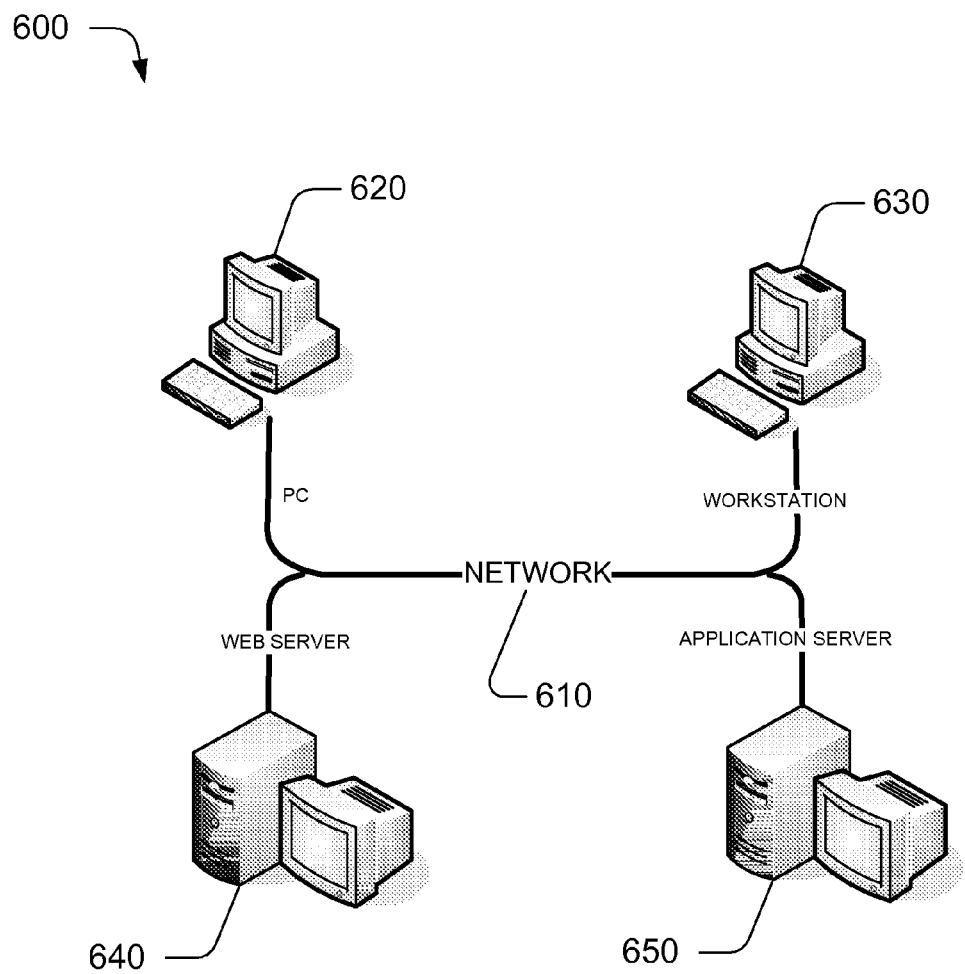
FIG. 6 is a schematic of a system architecture for providing visualization of a total occlusion footprint in a point cloud population in accordance with an embodiment of the present disclosure.

FIG. 6 is a schematic of a system architecture 600 for providing visualization of a total occlusion footprint in a point cloud population in accordance with an embodiment of the present disclosure. In the system architecture 600 consistent with an embodiment of the present disclosure, as depicted in FIG. 1, a user utilizes a data processing system, such as a personal computer (PC) 620, and may use a communication network 610 (e.g., an Internet or intranet connection) in order to launch a program from a server 650. A display is used to provide the user with a choice of inputs to prepare a model (not shown). The program runs in memory on the server 650 or in a distributed system 640, which allows end-users and system designers and analysts to interact with the model to rapidly design, modify, and/or test and validate the model.

For example, in a client-server arrangement, a client computer system 630 and server computer system 650 would each be connected to the network 610, such as a Local Area Network, Wide Area Network, or the Internet. Some or all of the code or data can be stored on either the client or the server computer system, and some or all of the steps of the processes can be carried out on the server computer system 650, which is accessed by the client computer system 630 over the network. The present disclosure may also be implemented in such a distributed system environment.

Further, although aspects of one implementation are depicted as being stored in memory, it will be appreciated that all or part of the systems and methods consistent with the present disclosure may be stored on or read from other computer-readable media, such as secondary storage devices, like hard disks, floppy disks, and CD-ROM; a carrier wave received from a network such as the Internet; or other forms of ROM or RAM. Further, it will be appreciated that generic embedded technology architecture suitable for use with methods, systems, and articles of manufacture consistent with the present disclosure may contain additional or different components.

The present disclosure provides an end-to-end visualization application, which permits convenient, fast local area search (LAS) and initial identification of potential targets. In particular, an underside viewing of total ground occlusion domains provides an improved initial LAS technique. An application may operate with minimal user controls, including automatic isosurface level selection, and may rely primarily on a scalable O(N), where N is the number of raw data points, and parallelizable multi-resolution volume field construction algorithm (the Fast Binning Method) to produce near-real-time visualizations from giga-point clouds. The Fast Binning Method and the Marching Cubes Method based visualization of the associated multi-resolution population field are non-destructive test (NDT) data fusion technologies which are compatible with real time ladar data acquisition and visualization model delivery.

Rapid identification of target imagery obtained from ladar data relies on the performance of interactive 3D visualization. Exemplary techniques may use rapidly adjustable and intuitive visualizations of selected scenery generated from the ladar data. The techniques optimize the use of human recognition and decision-making, increasing the adaptability and flexibility of the implemented systems. The techniques may exclude unnecessary computations such as image segmentation and pattern matching to improve performance and other aspects.

When ladar data from a sortie is processed, an automatically selected isosurface may be presented to a user. The visualization view may be presented from the second orientation 340 (FIG. 3) as an up from the underground view of the isosurface, as if a user was looking at the image from underground. Therefore, an isosurface skin viewed from underground makes objects look like cavities within the ground. User interaction with the automatically selected population isosurface permits simplified recognition of areas of total ground occlusion such as tree trunks (elements 420, FIG. 4) and potential ground vehicles (elements 430, FIG. 4). For example, the user may pan around a display depicting a reversed orientation visualization model in search for cavities that look like vehicles or other manmade objects. In some aspects, the population isosurface may be colorized, or otherwise identified using crosshatching or similar techniques to depict local elevation. In such a process, a vehicle may be recognized by the user as a rectangular hole in the ground and may be evident even from low resolution renderings. In areas where no ladar data exists, such as in porous obstructions (e.g., bushes or tree branches), the porous obstructions may not be included in the isosurface because light travels through these objects. Therefore, total occlusion objects or obstructions (e.g., tree trunks and vehicles) may be visible even under low resolution processing. In embodiments where the isosurface level is selected automatically, potential targets may be recognized by a user with little or no training.

Figure 7:
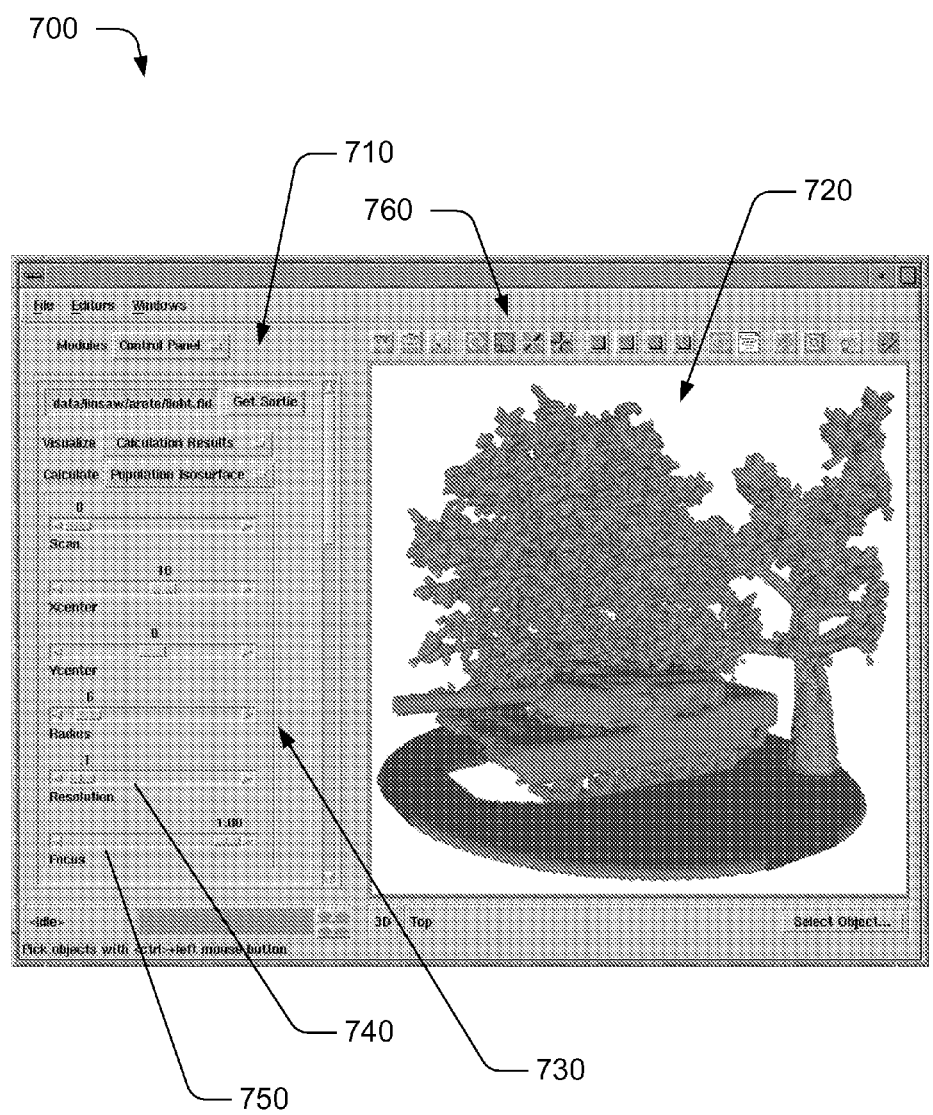
FIG. 7 is an exemplary user interface for detecting ground targets according to an embodiment of the disclosure.

FIG. 7 is an exemplary user interface for detecting ground targets according to an embodiment of the disclosure. The user interface may include a control panel 710 and a display portion 720. The control panel may provide a file browser, a toggle for selecting whether to visualize raw points or rendered surfaces, a toggle for selecting the surface computation algorithm, and a series of slider controls 730. The slider controls 730 may facilitate specifying which scan in the sortie to view, the location and size of a cylindrical region-of-interest (ROI) box for surface computation and visualization, and the sampling resolution to be used for computing the surfaces from the points.

A resolution slider 740 may be used to adjust the sampling resolution of the points displayed in the isosurface, and thus enable a user to change the resolution and interactively identify the regenerated object in the display portion 720. For example, when the slider is in a first position, the display portion 720 may display an isosurface that is not identifiable to the user. However, when the user moves the resolution slider 740 to the right or left, the display portion 720 continually changes to reflect updated sampling resolutions. Typically, the user will identify the object in the display portion after minor adjustments to the resolution slider 740. This process uses human recognition of visual objects by providing real-time or near real-time processing of the object in the display portion 720 of the user interface 700. A focus slider 750 may be used to adjust the automatically selected isosurface level. In addition, a series of standard buttons 760 may be included, each with an associated visualization control function.

The level for rendering population or pseudo-validity isosurface from points in a region of interest (ROI) may be set automatically using the following technique. The ROI for visualizing the population, validity, and distance fields may be configured as a cylindrical domain of radius r whose axis is parallel to the Z-axis. In other embodiments for the population and validity threshold may include a user controlled fraction of either the average point density:

$$\bar{\rho} = \frac{n}{2\pi r^2 \Delta} \qquad \text{Eq. 1}$$

where $\Delta$ is the Z-extent of the point cloud, or of the area density:

$$\bar{p}_A = \frac{n}{2\pi r^2} \quad \text{Eq. 2}$$

In one instance, a user controlled fraction of the maximum population within the ROI is selected and may provide the most robust resolution (sampling) changes for differing environmental conditions (e.g., presence or absence of foliage). The user control designated "Focus" on the may be a slider with a range, such as from 0.1 to 1.0, used to control a multiplier to the maximum population, $\alpha$.

$$P_T = \alpha \max(P \epsilon \Omega_{ROI}) \quad \text{Eq. 3}$$

Figure 8:
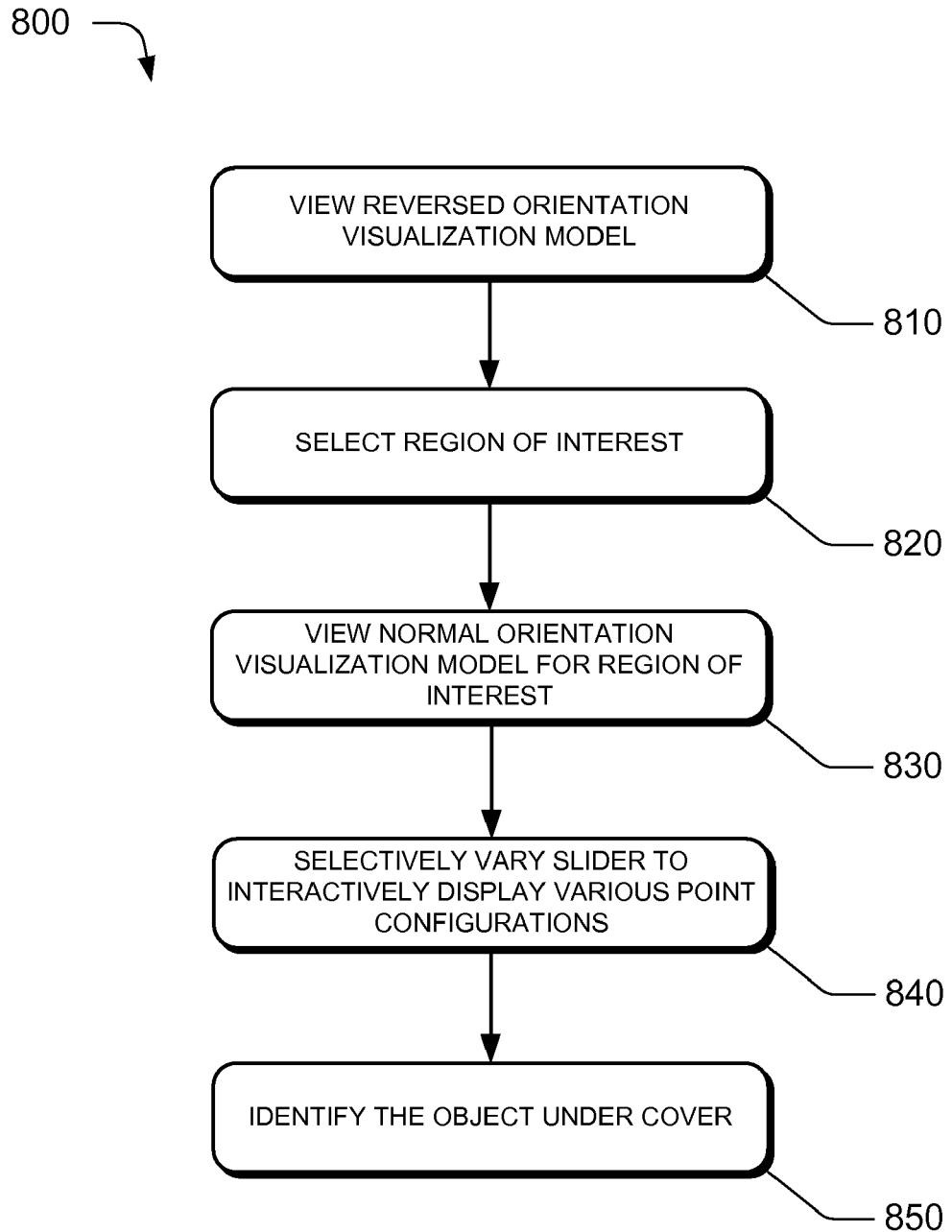
FIG. 8 is a flow diagram of a process for identifying an object under cover according to an embodiment of the disclosure.

FIG. 8 is a flow diagram of a process 800 for determining an object under cover according to an embodiment of the disclosure. The process 800 may enable a user to identify an object under cover, such as a potential ground target including a tank or military vehicle covered by foliage. At a block 810, the user views a reversed orientation visualization model of an isosurface depicting a location. As illustrated in FIG. 4, the user may see tree trucks and vehicles depicted as cavities in the isosurface when viewed from the underground orientation, such as the observation point 340 shown in FIG. 3.

At a block 820, the user may select a region of interest for further viewing and identification of a potential object, such as one located at the block 810. For example, the user may discover a rectangular cavity at the block 810 and then select this region of interest at the block 820 in order to identify the object. At a block 830, the user views the normal orientation visualization model for the region of interest. For example, the user views the object from the first observation point 315 shown in FIG. 3.

The process 800 continues at a block 840 where the user selectively varies the user controls, such as the resolution slider 740 in FIG. 7 to interactively display various point configurations in the display portion 720 of the user interface 700. Through manipulation of the point configurations, the user identifies the object under cover.

The following section discloses exemplary algorithms for displaying point configurations and isosurfaces. Any number of algorithms may be effectively utilized to generate an isosurface which may be displayed in a reversed visualization orientation model, depicting an up from underground view of an isosurface.

Computational Algorithms Providing Visualization of Total Occlusion Footprint in Point Cloud Population.

The scalar functions are designated "population function," "distance function," and "pseudo-validity function." The first is computed by the Fast Binning Method and the second is computed by the Fast Marching Method. "Pseudo-validity function" is an estimate of the true validity function realized by convolving a population function with an approximate point spread function (PSF). The Fast Binning Method uses integer truncation (casting) of each resolution scaled coordinate to index a data array element to be incremented. The value of each sampling point in the computed scalar field numerically corresponds to the relative proximity (within a half resolution element) to the sampling point. The Fast Marching Method is a similar algorithm, which resolves to a scalar field, which corresponds to the proximity of the nearest point in the point cloud from this sampling point. Where appropriate, the uncertainty in point position is defined by the point spread function for the particular 3-D sensor. It may be used to compute the validity function, thus summation of normalized point spread functions for each measured point, sampled on a specified uniform grid.

Implicit geometry representations and Level Set Methods resolve scaling and accelerability bottlenecks associated with explicit point or surface geometry modeling representations. Since advanced 3-D sensors are capable of digitizing as much as a gigapoint (one billion points) for a local scene, processing steps, which scale with the number of raw data points (N) or higher ideally are minimized, parallelized, or eliminated. Processing times for steps such as mesh generation or sorting points scale with N log (N) or other trends requiring more time, and are examples of explicit processing steps which quickly become intractable for a large numbers of points. By re-expressing the raw data points as a scalar function evaluated at a number (n<<N) of user specified sampling points (usually on a uniform or rectilinear grid), subsequent operations can be arbitrarily more tractable, with the potential disadvantage that spatial precision may be lost. Processing times for the operational steps to re-express the raw data points as a volume field will scale at best with N.

This section provides a mathematical description of multi-resolution volume field representations and the associated algorithms for approximating sets of registered point clouds and associated point spread functions. Table 1 includes illustrative algorithms that may be applied to ladar visual model reconstruction.

TABLE 1

| Algorithm combination | Processing scaling relations | Implementation |
|---|---|---|
| Population isosurface | $t_f \sim N$ $t_f \sim n \log n$ | COTS + InitPopulation + JSCalcPopulation |
| Distance function + fast tagging based shrinkwrap | | COTS + JSInitPopulation + JSCalcDistance + JSShrinkDF |
| Pseudo-validity isosurface | $t_f \sim N$ $t_c \sim N \times p$ $t_f \sim n \log n$ | COTS + JSInitPopulation + JSCalcPopulation + JSCalcValidity |

A partially fixed (in the ladar case, earth or "camera" fixed) coordinate system is established. The particular system used depends on test methods, part geometry, and recognition objectives. For aerospace components, a surface coordinate system which expresses position in terms of surface coordinates such as meridional, circumferential, and through-thickness position relative to a series of fiducials are often employed. Multiple part-fixed coordinate systems are often defined to ease data organization. However, the mathematical transformations between coordinate systems should be established analytically and should be reversible.

Each inspection feature of interest may include a mathematical generalization of the feature extracted from the non-destructive inspection (NDI) to be defined. This generalized feature represents the instantaneous value of the NDI parameter at a point in space such that the weighted average over the domain of the inspection "beam" (or volume of interaction) would be the value measured and recorded in an inspection. Generalized features must have the property of being intensive, that is, the units in which the features are expressed do not depend on the geometry of the domain they represent. Examples of appropriate NDT features are ultrasonic attenuation (dB/meter), CT density (gm/cm3), or resistivity (ohms-meter). A measurable datum is considered to be the weighted average over the volume of interaction (represented by the PSF) of the generalized feature.

In the ladar case, digitized reflection "intensity" may be corrected for system nonlinearities, and normalized and scaled by remaining incident power at each time bin and by the area subtended by the solid angle of illumination at that range. An appropriate analytic functional form over space to represent the generalized feature distribution may be defined using two extensive functions. If the convolution distribution for the interaction can be prescribed analytically then superposition of point spread functions (validity function) may be employed. Additionally, an approximating orthogonal set of functions is established a priori, piecewise continuous over the domain of the part and operated upon using tables of coordinates and element connectivity. The finite element theoretical approach to defining this functional form is most convenient, since it lends itself to being parameterized by the inspection data, and eliminates dependence on a particular inspection raster. In this form, each "node" corresponds to the origin of a particular voxel. The shape of the voxel is the distribution over space of the influence of the measuring interaction (represented by the point spread function) rather than a discrete domain.

Finally, mathematical approaches to evaluating inspection features over arbitrary volume surface line, and point elements may be developed. Generally, evaluating an inspection feature for arbitrary elements, such as voxels from other inspection modalities or mechanical test specimens, becomes a matter of numerical evaluation of domain integrals, which by employing conventional finite element theory can be reduced to algebraic expressions in terms of the original test data.

These procedures, when embedded in software, may ensure improved evaluation accuracy when compared to conventional counting and interpolation approaches, improving the quality of data correlations considerably. It also provides a framework for handling the data computationally in an extremely unified and flexible form independent of the scan raster, reducing the complexity of data reduction and analysis software, especially when multiple modality tests of the same part are being analyzed. In particular it simplifies averaging, coordinate and raster transformations, dimensional reductions and comparison functions by replacing heuristic approximations dependent on sensor characteristics with uniform analytic algebraic operations, which preserve data integrity.

Techniques for determining the point spread functions (PSF) for a particular instrument and set of test conditions are now disclosed. The point spread function represents the impulse response of the system, thus, in principle, can be measured by passing an infinitely small (and instantaneous) "object" (e.g., reflector) through the volume of interaction of the sensor. In practice, small objects cannot be observed because their response is outside of the limited dynamic range of sensor systems. To resolve this problem, the edge spread function (ESF) is measured, which can much more easily be done by fabricating or selecting a known calibration object, then differentiate and normalize the ESF to determine the PSF.

Typically, sensor coordinate systems must be selected using knowledge of the sensor physics and geometry, which allow separation of the response functions. Optical sensors system which can be approximated as a pinhole camera (e.g., ladars), would often use a spherical polar coordinate system whose origin is at the sensor to express the range, azimuthal, and elevation components of the PSF as three separable functions of a single coordinate:

$$P(r,\Theta,\Phi)=Q(r)R(\Theta)S(\Phi) \quad \text{Eq. 4}$$

A "step wedge" (e.g., corner of flat-roofed building in front of a larger building) could be aligned to the angular axes of the sensor and the edge response measured by averaging the response across each edge in the "along edge" direction at a known range. Similarly, range response could be determined by averaging measured range over the "flat" part of the step wedge, and normalized to estimate the range component of the PSF. The edge responses, expressed in the corresponding polar coordinates can be differentiated numerically with respect to each coordinate, and then normalized, to arrive at the angular components of the PSF.

The following descriptions describe the basic process for generating multi-resolution volume field representations of point clouds. Let $\Omega$ denote the physical domain of the test on which a set of sampling points $P \subset \Omega$ is collected from a single ladar (or equivalent) scan. A single scan may be a set of points nominally representing ladar reflections from a point light source (designated as the scan origin). Generally, the PSF for each point has been determined approximately by a product of separable functions of each of the three associated spherical polar coordinates. The following steps describe methods that may be used to compute the three volume fields (population, distance, and validity) and associated visualization surfaces that approximate the real surface represented by point cloud P.

A: Population and Occupation Volume Field and Associated Isosurface (Table 1, Row 1)

Population and occupation function are defined their computational algorithm. A 3-D point cloud and orthogonal rectangular domain $\Omega$ may be bounded by two corners:

$$\vec{r}_l = \begin{Bmatrix} x_l \\ y_l \\ z_l \end{Bmatrix} \, l=1,N \quad \text{Eq. 5}$$

$$\vec{r}_{min} = \begin{Bmatrix} x_{min} \\ y_{min} \\ z_{min} \end{Bmatrix}$$

$$\vec{r}_{max} = \begin{Bmatrix} x_{max} \\ y_{max} \\ z_{max} \end{Bmatrix}$$

If a desired spatial resolution is specified, $$\vec{\Delta} = \begin{Bmatrix} \delta_x \\ \delta_y \\ \delta_z \end{Bmatrix} \quad \text{Eq. 6}$$

a zero initialized rectangular array $P_{ijk}$, corresponding to uniform sampling positions over $\Omega$, is incremented by one at each qualifying (in $\Omega$) integer cast scaled coordinate:

$$P_{(x_l/\delta_x)(y_l/\delta_y)(z_l/\delta_z)}++ \quad \text{Eq. 7}$$

The resultant "3-D histogram" is combined with the corner coordinates into a uniform field representation, referred to as the "population field", since the scalar value at each sampling position corresponds to the number of points within a relative proximity (within a half resolution element) to the sampling point.

Typically, no sorting and very few floating point operations are required, therefore, this is an extremely fast O(N) operation where N is the number of raw data points in the point cloud. Occupation field is simply the logical (Boolean) consequence of thresholding the population, typically by evaluating "population>0." In other words, the technique determines if the local vicinity occupied or if the population is less than a minimum population for significance.

Distance Function Volume Field and Associated Isosurface (Table 1, Row 2)

The distance function $d(\vec{w})$ for any $\vec{w}$ in $\Omega$ to the data point set P is defined as the solution to the following Eikonal equation:

$$|\nabla d|=1 \text{ and } d(\vec{w})=0, \vec{w} \in P \qquad \text{Eq. 8}$$

The observed space $\Omega$ is partitioned into a uniform mesh, and the distance of each mesh point is computed. For a given threshold $d_T$, the isosurface $S \subset \Omega$ is computed such that for any $\vec{w} \in S, d(\vec{w})=d_T$. A set of triangular elements representing S are constructed by using Marching Cubes method.

Distance function may be an approximate PSF by transforming into a space where the PSF has approximately spherical symmetry, thus using $$\frac{1}{1+d(\vec{w})^k} \qquad \text{Eq. 9}$$

for some integer k as an approximate PSF.

Shrink wrapping of the distance function (or other function) is the process of marching back from a positive distance isosurface towards zero distance while satisfying a curvature condition. In one instance, "fast tagging" condition may be selected for its processing speed advantage. Shrink wrapping has the effect of retaining locally convex topology, in effect—filling in for missing (i.e., occluded) data.

Pseudo-Validity Function (Table 1, Row 3)

By approximating the true PSF for each point within $\Omega$ by a single spherically symmetric "bump function" evaluated on the current sampling raster, a rough approximation to the validity function can be computed by a convolving the kernel (the sampled "bump function") with the population field. While this results in a small location errors and inaccuracies due to range independence, this provides an economical way of improving the fidelity of the population function isosurface. The discrete PSF convolved population function is designated the "pseudo-validity function."

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A computer implemented method to detect a presence in an area of study of a ground-level object, the method comprising:
    gathering, in a processing device, a point cloud of three-dimensional imaging data representing the area of study from an aerial position where an intervening obstacle impedes a line of sight between the aerial position and a ground-level object;
    processing, in the processing device, the three-dimensional imaging data to identify elements in the point cloud having common attributes signifying that the identified elements correspond to a feature in the area of study that is at least partially obscured by the intervening obstacle;
    generating, in the processing device, at least one implied geometrical representation which represents data points having equivalent scalar values as calculated from the collected data;
    generating, in the processing device, at least one isosurface associating the elements having common attributes;
    selecting, in the processing device, a region of interest from the area of study;
    generating, in the processing device, from the imaging data gathered from the aerial position an up from underground oriented visualization model of the region of interest; and
    displaying, on a display module coupled to the processing device, the up from underground oriented visualization model to expose the feature in the area of study that is at least partially obscured by the intervening obstacle in the line of sight between the aerial position and the ground-level object.

2. The computer implemented method of claim 1, wherein the three-dimensional imaging data of the area of study is gathered using ladar.

3. The computer implemented method of claim 1, wherein imaging data is processed using a population function computed on a sampling mesh by a Fast Binning Method (FBM).

4. The computer implemented method of claim 1, wherein the isosurface of the population function is computed using a marching cubes method.

5. The computer implemented method of claim 1, further comprising allowing an operator to manually select the region of interest from the area of study.

6. The computer implemented method of claim 1, wherein the up from underground oriented visualization model exposes areas of total ground occlusion.

7. The computer implemented method of claim 1, further comprising regenerating the up from underground oriented visualization model using interactive user input from a slider resolution control.

8. The computer implemented method of claim 7, wherein the slider resolution control dynamically regenerates the up from underground oriented visualization model when a user changes the slider resolution control position.

9. The computer implemented method of claim 1, wherein the up from underground oriented visual model disambiguates areas of total ground occlusion from porous ground occluders.

10. A computer implemented method, comprising:
    gathering, in the computer, a point cloud of three-dimensional imaging data representing the area of study from an aerial position where an intervening obstacle impedes a line of sight between the aerial position and a ground-level object;
    processing, in the computer, the three-dimensional imaging data to identify elements in the point cloud having common attributes signifying that the identified elements correspond to a feature in the area of study that is at least partially obscured by the intervening obstacle;
    generating, in the computer, at least one implied geometrical representation which represents data points having equivalent scalar values as calculated from the collected data;
    viewing, on a display coupled to a processing device, a reversed orientation visualization model of an isosurface generated from the three-dimensional imaging data;
    selecting, on the display, a region of interest from the reversed orientation visualization model;

viewing, on the display, the region of interest of the isosurface as a top-down orientation visualization model;
selectively varying the point resolution of the region of interest on the display to adjust the isosurface sampling resolution; and
identifying an object within the isosurface.

11. The computer implemented method of claim 10, wherein the isosurface includes an area of partial ground occlusion and an area of total ground occlusion, the area of total ground occlusion depicted as a cavity within the isosurface when viewed in the revered orientation visualization model.

12. The computer implemented method of claim 10, wherein selecting the region of interest includes selecting a cavity with the isosurface.

13. The computer implemented method of claim 10, wherein selectively varying the point resolution includes user interaction with a slider control.

14. The computer implemented method of claim 10, wherein identifying an object within the isosurface includes identifying a target that is at least partially obscured in a top-down image.

15. The computer implemented method of claim 10, wherein the isosurface is generated from a point cloud population generated from ladar.

16. A computer based system to detect a presence, in an area of study, of an object, the system comprising:
 a data gathering device to gather a point cloud of three-dimensional imaging data representing the area of study from an aerial position;
 an image processor to identify one or more data elements in the point cloud of three dimensional imaging data which have substantially common attributes and to generate at least one implied geometrical representation which represents data points having equivalent scalar values as calculated from the collected data;
 an isosurface generator to generate at least one isosurface associating a subset of the one or more data elements having substantially common attributes which indicate that the identified elements correspond to a feature in the area of study that is at least partially obscured by an intervening obstacle;
 a region of interest selector to enable a user to select a region of interest from the area of study;
 a visualization model generator to generate, from the three-dimensional imaging data gathered from the aerial position, an up from underground oriented visualization model of the region of interest; and
 a display module to display the up from underground oriented visualization model to expose the feature in the area of study that is at least partially obscured by an intervening obstacle in a line of sight between the data gathering device and the object.

17. The system of claim 16 wherein the data gathering device comprises a ladar.

18. The system of claim 16, wherein:
 the image processor uses a population function computed on a sampling mesh by a Fast Binning Method (FBM); and
 the isosurface generator uses a marching cubes method to determine an isosurface.

19. The system of claim 16, wherein the up from underground oriented visualization model exposes areas of total ground occlusion.

* * * * *